US012665993B2

(12) United States Patent
Kayser

(10) Patent No.: US 12,665,993 B2
(45) Date of Patent: Jun. 23, 2026

(54) LASER PROJECTION SYSTEM HAVING A MULTIPLICITY OF LASER PROJECTORS

(71) Applicant: LAP GMBH LASER APPLIKATIONEN, Lueneburg (DE)

(72) Inventor: Daniel Kayser, Hamburg (DE)

(73) Assignee: LAP GMBH LASER APPLIKATIONEN, Lueneburg (DE)

( * ) Notice: Subject to any disclaimer, the term of this patent is extended or adjusted under 35 U.S.C. 154(b) by 108 days.

(21) Appl. No.: 18/854,797

(22) PCT Filed: Apr. 5, 2023

(86) PCT No.: PCT/EP2023/059037
§ 371 (c)(1),
(2) Date: Oct. 7, 2024

(87) PCT Pub. No.: WO2023/194489
PCT Pub. Date: Oct. 12, 2023

(65) Prior Publication Data
US 2026/0156235 A1 Jun. 4, 2026

(30) Foreign Application Priority Data

Apr. 7, 2022 (DE) ......................... 102022108366.7

(51) Int. Cl.
*H04N 9/31* (2006.01)
*G01B 11/00* (2006.01)
(Continued)

(52) U.S. Cl.
CPC ......... *H04N 9/3194* (2013.01); *G01B 11/002* (2013.01); *G01B 11/25* (2013.01);
(Continued)

(58) Field of Classification Search
CPC ...... H04N 9/3194; H04N 9/31; H04N 9/3147; H04N 9/3161; G01B 11/002; G01B 11/25; G01S 17/48; G03B 21/2033; G03B 35/20
(Continued)

(56) References Cited

U.S. PATENT DOCUMENTS

| | | | |
|---|---|---|---|
| 9,879,983 B2 | 1/2018 | Kaufman et al. | |
| 10,432,903 B2 | 10/2019 | Kaufman et al. | |
| 2009/0257069 A1 | 10/2009 | Rueb et al. | |
| 2010/0134702 A1* | 6/2010 | Kondo ................ | H04N 9/3194 348/744 |
| 2017/0038195 A1 | 2/2017 | Kaufman et al. | |

FOREIGN PATENT DOCUMENTS

| | | |
|---|---|---|
| DE | 102007059907 A1 | 6/2009 |
| DE | 112016001118 T5 | 3/2018 |

(Continued)

OTHER PUBLICATIONS

Kassebaum, John et al. "3-D target-based distributed smart camera network localization." IEEE transactions on image processing 19.10 (2010): 2530-2539.
(Continued)

*Primary Examiner* — Sherrie Hsia
(74) *Attorney, Agent, or Firm* — Perry + Currier

(57) ABSTRACT

At least two laser projectors detect their spatial position relative to the mobile target system and a higher-level control system determines relative poses of the at least two laser projectors to one another from the detected spatial positions, wherein the higher-level control system is designed to repeat the determination of the relative poses in different spatial positions of the mobile target system until at least one relative pose to other laser projector is determined, wherein in addition at least one spatially fixed target system is provided, which can be detected by at least one laser projector, and the higher-level control system is designed to convert the relative poses of all laser projectors from the
(Continued)

Figure 1:
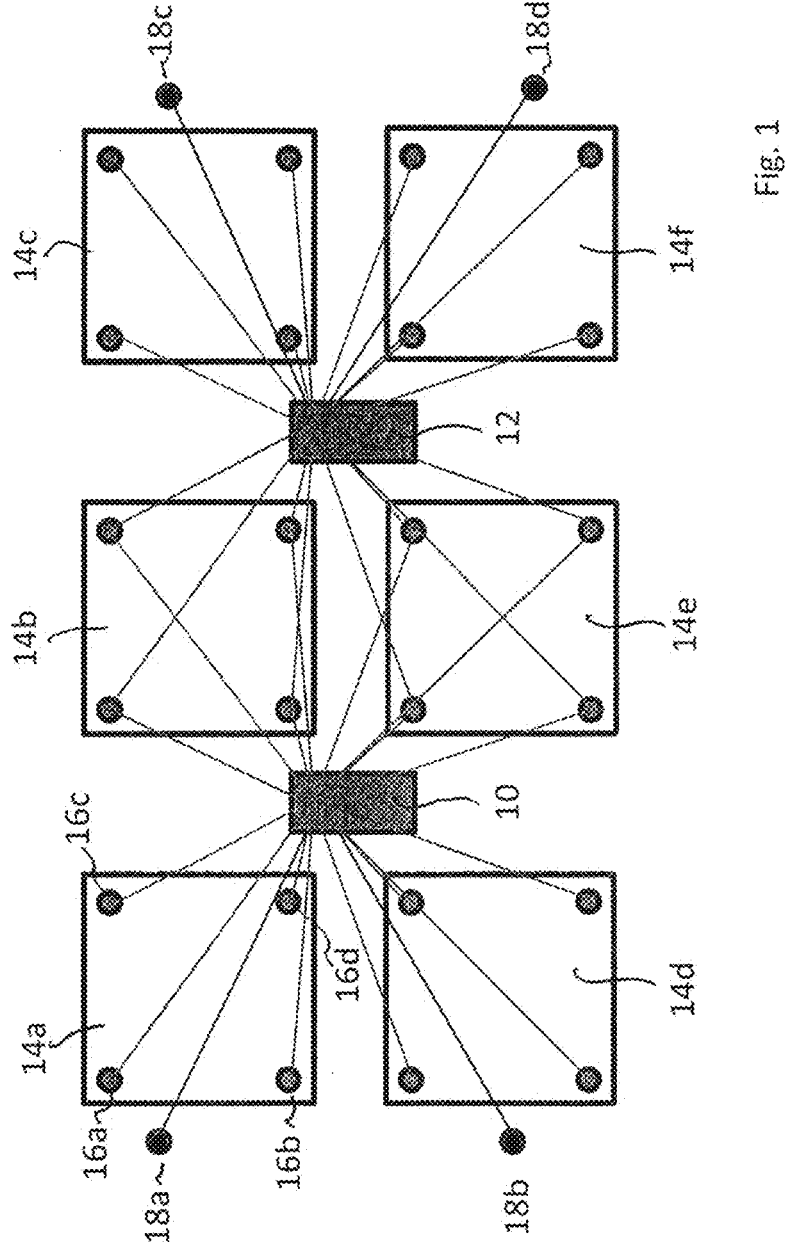

reflection angles of the detected markers of the spatially fixed target system by the at least one laser projector into spatial poses.

10 Claims, 3 Drawing Sheets

(51) Int. Cl.
    *G01B 11/25*       (2006.01)
    *G01S 17/48*       (2006.01)
(52) U.S. Cl.
    CPC ........... *G01S 17/48* (2013.01); *H04N 9/3147* (2013.01); *H04N 9/3161* (2013.01)
(58) Field of Classification Search
    USPC ..................................... 348/744–747; 353/94
    See application file for complete search history.

(56) References Cited

FOREIGN PATENT DOCUMENTS

| WO | WO-2007038746 A2 | 4/2007 |
| WO | WO-2021033185 A2 | 2/2021 |
| WO | WO-2021069079 A1 | 4/2021 |

OTHER PUBLICATIONS

Luhmann, Thomas, "Nahbereichsphotogrammetrie", with English translation, "Short-range photogrammetry", Wichmann, 2010.

Dold et al., "Verfahren zur Regulierung von 3D-Punktwolken" with English translation "Procedure for registering 3D point clouds", 2nd Hamburg User Forum Terrestrial Laser Scanning, Jun. 14, 2007, ikg.

* cited by examiner

LASER PROJECTION SYSTEM HAVING A MULTIPLICITY OF LASER PROJECTORS

The present invention relates to a laser projection system with a plurality of laser projectors. Each individual laser projector has a projection area in which points, lines and geometric figures can be projected with a laser beam. In general, the laser projectors have a laser beam that is deflected by two mirrors. The axes of the motorized mirrors are at an appropriate angle to each other so that the laser beam can be deflected in any direction within the projection area.

A laser projection system is known from U.S. Pat. No. 9,879,983 B2, in which a large number of laser projectors are projected onto a large object, such as an aircraft. In addition, reference targets are provided on masts. The laser projectors determine their position relative to the fixed reference targets.

A method for determining the position of a laser projector is known from WO 2007/038740 A2, in which several laser projectors are integrated into a lifting platform. The laser projectors project together onto an aircraft under construction.

A laser projection system is known from DE 11 2016 001 118 T5, which can perform the positioning of movable parts and assemblies using 3D laser projections and projected templates. The movable part is equipped with reflector markings that the laser projector follows.

A measuring system and a coordinate measuring device for use in a smart factory environment were disclosed in WO 2021/069079 A1. The measuring system has a defined arrangement of various measuring devices configured so that the coordinate measurement data generated by various measuring devices can be referenced to a common coordinate system.

A measuring tool for determining the position and orientation in relation to a construction site was disclosed in WO 2021/033185 A2. With the help of a laser projector, the desired construction plans are projected onto a target area, for example to improve the accuracy and efficiency in the execution of a construction project.

In the case of the known laser projection systems with several laser projectors, there is the technical problem of determining the position of the laser projectors in space as accurately as possible. However, this is a prerequisite for being able to project accurately onto a workpiece with one or more laser projectors.

The object of the invention is to provide a laser projection system with a plurality of laser projectors whose position in space can be determined as accurately as possible with respect to a workpiece/coordinate system.

According to the invention, the problem is solved by a laser projection system with the features from claim 1. Advantageous embodiments are the subject of the subclaims.

The laser projection system comprises a plurality of laser projectors, each having a projection area. In the projection area, a laser beam can be projected onto points in space. In addition, the laser projector can determine the directions of the incident laser beam for a reflected laser beam. The plurality of laser projectors is arranged so that the projection areas can be meshed (interleaved) with each other. Two areas can be meshed if there is at least one point in space that belongs to both projection areas. In the meshed area, the projection areas of the laser projectors overlap at least partially. In addition, the laser projection system has at least one mobile target system with four or more markings, which can be used to determine the pose of the mobile target system relative to one of the laser projectors. The pose includes a three-dimensional position and an orientation with respect to the three spatial directions, i.e. 6-dimensional data that allows a unique description of an extended object in space. In the following, "pose" is always used in the sense of position and orientation, whereby a relative pose describes a position and an orientation relative to a coordinate system with its position and its orientation. Such a coordinate system, to which the relative pose refers, can be provided by another laser projector or by a target system. Accordingly, the spatial pose denotes the position and orientation with respect to a space with its origin and its orientation. According to the invention, at least two laser projectors detect their spatial position relative to stationary positions of the mobile target system, and a higher-level control system determines the relative position of the at least two laser projectors to each other from the detected spatial positions. In addition, the higher-level control system is designed in such a way that it repeats the determination of the relative pose at different spatial positions of the mobile target system for each stationary position of the mobile target system until at least one relative pose to another laser projector has been determined for each of the laser projectors. A network of relative poses is created between the laser projectors, which describes how the position and orientation of a laser projector is related to one or more other laser projectors. Preferably, the network includes all laser projectors. The laser projection system according to the invention is additionally equipped with a spatially fixed target system with four or more markers. Each marker of the spatially fixed target system is detected by at least one laser projector. The higher-level control system is designed to convert the relative poses of the multiple laser projectors, which are determined from the markers of the spatially fixed aiming system that is detected by the at least one laser projector, into spatial poses of all laser projectors. When converting the relative poses into the spatial poses of the laser projectors using the markers of the spatially fixed aiming system, it is sufficient to detect only direction angles for the spatially fixed markers; a complete detection of a pose is not necessary. Of course, it is also possible to determine a relative pose of the spatially fixed markers, but this is not necessary. The laser projection system according to the invention also works in a two-step process: in the first step, the laser projectors are localized in position and orientation relative to each other. This is done by having two or more laser projectors jointly look at a mobile target system with four or more markers, thus determining their relative pose to each other. In a second step, one or more laser projectors capture markers of the spatially fixed target system. In the second process step, the position and orientation of all laser projectors in space can then be determined by optimizing the relative poses and including the spatially fixed markers. When capturing the spatially fixed target system, the at least one laser projector can determine its relative pose if four or more markers are in its projection area. However, it is also sufficient if a total of four or more angle pairs from one or more laser projectors on the stationary markers of the stationary target system are detected. The angle pair consists of a pair of angle tuples under which the laser projector detects the stationary marker. Thus, the angles of incidence on a marker of the stationary target system are those that are detected by the laser projector. The projection accuracy of the laser projection system that can be achieved with this method depends on the dimensional accuracy of the stationary and mobile target systems and can be less than one millimeter per ten meters, making the laser projection system ideal for large-area applications.

In a particularly favorable embodiment, the mobile target system can be moved through the space to be measured and thus detected by the laser projectors in different spatial positions. For example, two laser projectors can track the movement in a certain area of the room and repeatedly calculate their respective relative position with respect to the target system and thus their relative position with respect to each other. This results in a very high accuracy in determining the relative positions of the laser projectors to each other.

With regard to overall accuracy and free use of the area, it has proven advantageous to have several space-fixed markers of the space-fixed target system positioned at least partially in a peripheral area of the total projection area. The arrangement in the peripheral areas also leaves the central area of the total projection area free for use. The total projection area is the union of the individual projection areas, whereby their interlacing results in overlaps of the projection areas. The positions and orientations of the laser projectors within the overall projection area can be determined relatively accurately by means of several stationary markers positioned in a peripheral area of the overall projection area, since these are integrated, as it were, like in a network of several laser projectors from different directions with their relative positions and relative orientations.

In a preferred embodiment, the higher-level control is adapted to perform a joint minimization with the relative poses and the spatial poses of the laser projectors in order to determine the spatial poses of all laser projectors with minimal error. The minimization can also include the case that, based on the tracking of the stationary target system, the minimization of the relative poses is repeated or at least corrected.

In a preferred embodiment, the mobile target system is a drivable system that has four or more retro-reflective markers. The mobile target system can then be driven within the projection area.

Preferably, the higher-level control system is additionally designed to detect a single marker with two or more laser projectors during a movement and to determine its spatial position. In this case, the higher-level control system determines, for example, an angular pair, which is evaluated, for example, by triangulation, i.e. based on the relative poses of the involved laser projectors to each other, and the spatial position of the single marker is detected. The single marker can also be part of the mobile target system, so that it can also be used for this task. With this setup, for example, the background can be measured very accurately by moving or positioning the single marker at a constant distance above the underground (floor). For example, the underground can be measured very accurately with the mobile target system if sufficient relative poses of the laser projectors to each other have been determined and the recorded values are then subsequently evaluated in terms of a position determination, for example by triangulation. If only a few relative poses are known, it is difficult to distinguish from the data obtained whether there is a deviation in the arrangement of the laser projectors or whether there is an unevenness in the ground. However, if the spatial poses of the laser projectors have been determined with sufficient accuracy, this allows conclusions to be drawn about the background.

In a preferred embodiment, the stationary target system has a coding that can identify the manufacturer of the stationary target system; for example, the laser projection system can be equipped with a camera for this purpose. The higher-level control system can use the coding to assign the target system its spatial position. In this way, the stationary target system can be used without its position in space or relative to the laser projectors having to be determined in advance. The higher-level control system then knows the position of the respective markers in the stationary target system.

In a preferred embodiment, the mobile target systems have at least four markings that are arranged in a predetermined alignment to one another, so that the laser projector can determine its position relative to the markings. If the markings are written by at least two laser projectors in an intermeshed projection area, they enable the relative positions of the laser projectors to one another to be determined on the basis of their predetermined alignment to one another.

In a preferred embodiment, the laser projectors are stationary in space, for example mounted in a hall, such as an exhibition, market or conference hall. The laser projectors can also be mounted in large-area halls such as concert, theater or other event halls. The projection surfaces or their sub-areas that contain spatial points belonging to two projection surfaces form the meshed surfaces. Each projection surface is meshed if at least one of its spatial points also falls within a second projection surface.

Figure 2:
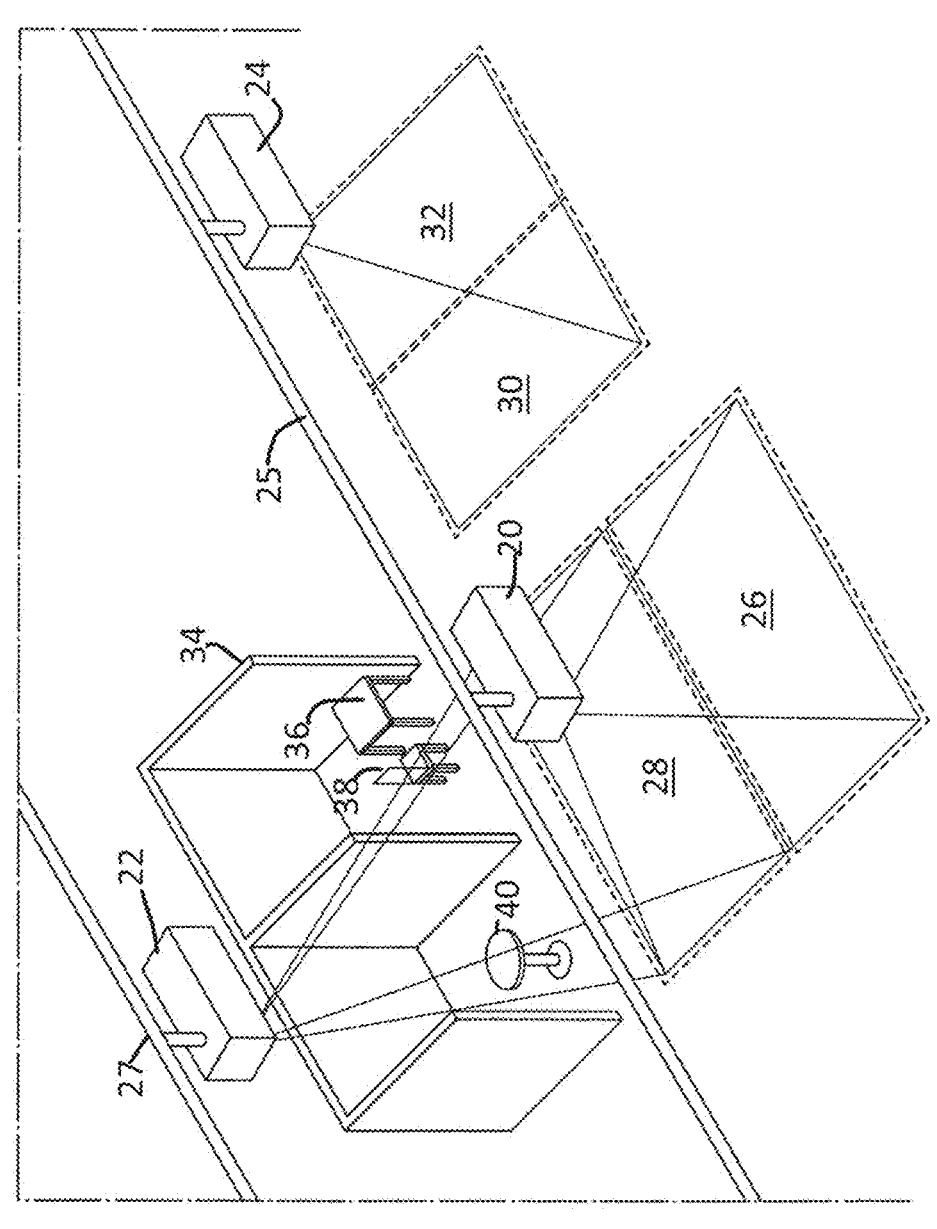
Figure 3:
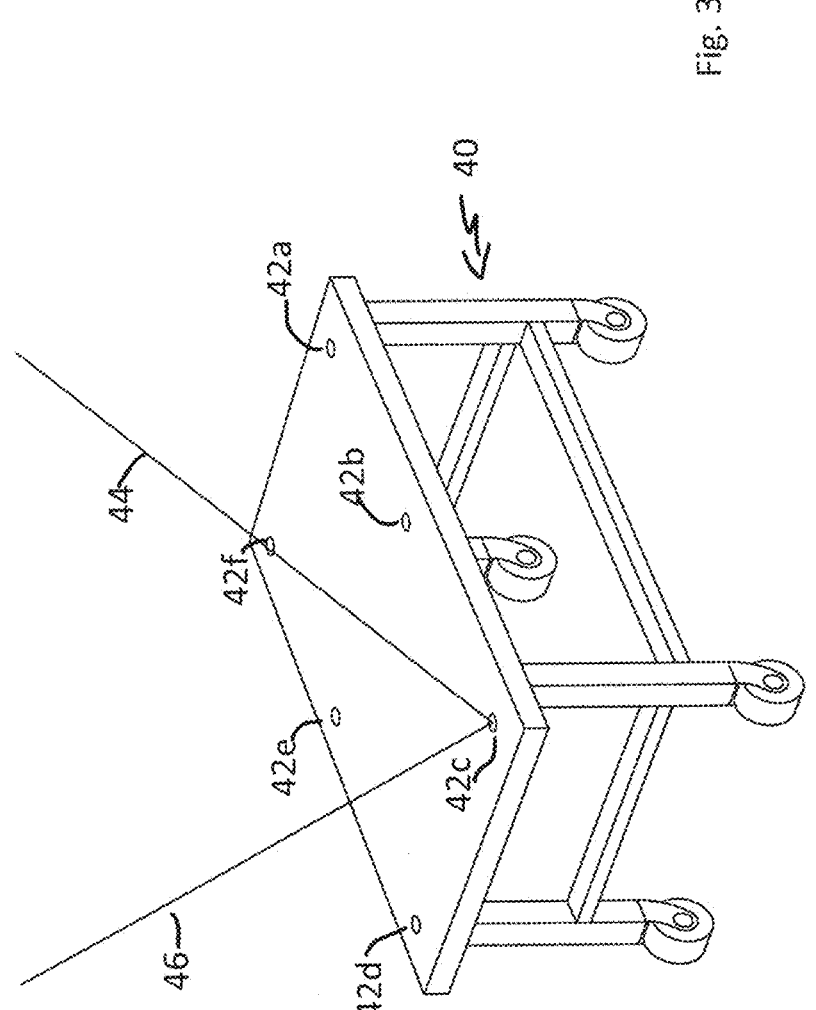

The invention is explained in more detail below using an embodiment:

FIG. 1 shows a schematic view of two laser projectors with different positions of the mobile target system, FIG. 2 shows a schematic view of laser projectors as they can be used in trade fair construction, and FIG. 3 shows a mobile target system.

FIG. 1 shows two laser projectors 10, 12, which are mounted in a fixed position in the room, for example. In addition, a mobile target system 14 is shown in six different positions 14a, 14b, 14c, 14d, 14e, 14f. The mobile target system has four markings 16a, 16b, 16c, 16d.

To determine the positions of the laser projectors 10, 12 in space, the mobile target system can cycle through the positions 14a to 14f. In positions 14a and 14d, the laser projector 10 determines its relative position to the mobile target system 14a, 14d. The laser projector 10 can determine the position because the mobile target system carries four markings 16a to 16d that are arranged at a predefined distance and pattern to each other, so that the laser projector can triangulate its position relative to the markings by detecting several markings.

When the mobile target system is in position 14b and 14e, laser projectors 10 and 12 can determine their poses with respect to the target system. This means that the difference between the poses determined in this way describes the relative pose of laser projectors 10 and 12 to each other, since they are directed at the same target system. In this way, a network of relative poses can be established even with more than two laser projectors, each time the mobile target system is in an area where its position can be determined by two or more laser projectors.

The relative poses of laser projectors 10 and 12 (or the network of relative poses formed) are initially not spatially absolute. The assignment of the relative poses in space is only determined with the spatially fixed target positions 18a to 18d. To do this, laser projector 10 detects the position of targets 18a and 18b and laser projector 12 detects the position of targets 18c and 18d. In a subsequent adjustment calculation, the relative pose (or the network of relative poses) can be transferred into a spatially fixed network of absolute poses with the help of the positions of the stationary targets, which only have to be detected by at least one projector. When the above-mentioned network of relative poses is mentioned, this also includes chains of relative poses as 1:1 links. The denser the targets are distributed over the entire projection area in the stationary target system, the higher the accuracy that can be achieved for the spatial poses.

FIG. 2 shows three laser projectors 20, 22, 24 mounted in a hall. Roof rails 25, 27 are provided in the hall on which the projectors 20, 22, 24 are mounted. The projectors have projection surfaces 26 to 32 directed towards the floor. An overlapping projection surface 28 is created by projectors 20 and 22. Projector 24 also has two projection surfaces, with projection surface 32, for example, overlapping with a projection surface of another laser projector (not shown).

The laser projectors are used, for example, in trade fair construction, stage construction or in the construction of other facilities and structures to support them by projecting individual objects. For example, the position of movable walls 34 can be marked on the floor using laser projectors. The projection can be very precise due to the exact measurement of the background, so that designs for the movable walls to be set up can be implemented very accurately. The position of tables 36, 40 and a chair 38 can also be determined very precisely using the laser projectors.

Since, according to the invention, an exhibition hall, a concert hall, a conference hall, a theater stage or any other room can be precisely measured, the structures or conversions to be carried out in it can be very precisely defined with the help of the laser projectors. This considerably reduces construction and assembly times.

FIG. 3 shows a perspective view of a mobile target system 40 designed as a rolling table. A total of 6 retro-reflective markers 42a to 42f with known relative positions are mounted on the table top. The figure shows the case where a retro-reflective marker 42c is detected by the laser beams 44 and 46 of two projectors. From this double detection of at least four markers, the relative positions of the two projectors to each other can be calculated. The mobile target system 40 can be pushed through the hall to be measured, whereby the relative position of the two projectors 22 and 20 to each other in the overlapping projection areas, such as 28 in FIG. 2, can be determined.

The invention claimed is:

1. A laser projection system having a multiplicity of laser projectors, each having a projection area into which points in space can be projected by means of a laser beam, the projection areas forming meshed areas in which points in space belong to two or more projection areas, at least one mobile target system is provided, which has four or more markers and whose position relative to one of the laser projectors, at least two laser projectors detect their spatial position relative to the mobile target system and a higher-level control system determines the relative position of the at least two laser projectors to one another from the detected spatial positions, wherein the higher-level control system is designed to repeat the determination of the relative position in different positions of the movable target system in space until at least one relative position of each of the laser projectors to another laser projector is determined, wherein in addition a stationary target system is provided which is equipped with four or more markings, the markings of which can be detected by at least one laser projector, and the higher-level control system is designed in such a way that it converts the relative position of all laser projectors into spatial positions from the markings of the stationary target system, which are detected by the at least one laser projector.

2. The laser projection system according to claim 1, wherein the mobile target system is movable through the space and can be detected in different positions.

3. The laser projection system according to claim 1, wherein the four or more markings of the spatially fixed target system are positioned at least partially in a peripheral area of the total projection area.

4. The laser projection system according to claim 3, wherein the overall projection area is covered at least once by the union of the projection areas of the laser projectors.

5. The laser projection system according to claim 1, wherein the higher-level control is designed to carry out a minimization calculation with the relative poses and the spatial poses of the laser projectors in order to determine the spatial poses of all the laser projectors with minimal error.

6. The laser projection system according to claim 1, wherein a mobile system which has at least four retro-reflective markers is provided as mobile target system.

7. The laser projection system according to claim 1, wherein the higher-level control system is designed such that during a movement of an individual marker, one or more laser projectors detect this and determine its spatial position.

8. The laser projection system according to claim 1, wherein the mobile target systems have at least four markers which are arranged in a predetermined orientation with respect to one another, so that the laser projector can determine its relative position with respect to the markers of the mobile target system.

9. The laser projection system according to claim 1, wherein the laser projectors are mounted in a fixed position.

10. The laser projection system according to claim 1, wherein the markers of the target systems are designed as retro-reflecting markers.

* * * * *